(12) United States Patent
Tokuhiro et al.

(10) Patent No.: US 9,459,341 B2
(45) Date of Patent: Oct. 4, 2016

(54) RADAR SIGNAL PROCESSING APPARATUS, RADAR SIGNAL PROCESSING METHOD, AND RADAR SIGNAL PROCESSING PROGRAM

(71) Applicant: Panasonic Corporation, Osaka (JP)

(72) Inventors: Takafumi Tokuhiro, Kanagawa (JP); Hirofumi Nishimura, Kanagawa (JP); Takaaki Kishigami, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 387 days.

(21) Appl. No.: 14/240,074

(22) PCT Filed: May 30, 2013

(86) PCT No.: PCT/JP2013/003436
§ 371 (c)(1),
(2) Date: Feb. 21, 2014

(87) PCT Pub. No.: WO2014/061176
PCT Pub. Date: Apr. 24, 2014

(65) Prior Publication Data
US 2015/0198710 A1    Jul. 16, 2015

(30) Foreign Application Priority Data
Oct. 16, 2012  (JP) ................. 2012-228868

(51) Int. Cl.
*G01S 13/58* (2006.01)
*G01S 13/36* (2006.01)
(Continued)

(52) U.S. Cl.
CPC ............... *G01S 13/58* (2013.01); *G01S 13/36* (2013.01); *G01S 13/64* (2013.01); *G01S 13/505* (2013.01); *G01S 13/931* (2013.01); *G01S 2007/4013* (2013.01)

(58) Field of Classification Search
CPC ........ G01S 13/58; G01S 13/36; G01S 13/50; G01S 13/64; G01S 13/931

USPC ............. 342/70–72, 104, 105, 110, 115, 127
See application file for complete search history.

(56) References Cited

U.S. PATENT DOCUMENTS 4,106,019 A * 8/1978 Alexander ............ G01S 13/106
  342/108
5,191,347 A * 3/1993 Ishikawa ............... G01S 13/582
  342/108

(Continued)

FOREIGN PATENT DOCUMENTS

CN       102645649 A    8/2012
EP         2124071 A1   11/2009

(Continued)

OTHER PUBLICATIONS

Search Report for Chinese Application No. 2013800025411 dated Apr. 3, 2015.

(Continued)

Primary Examiner — Peter Bythrow
(74) Attorney, Agent, or Firm — Pearne & Gordon LLP

(57) ABSTRACT

A radar signal processing apparatus is disclosed which includes: time-series phase data generating section 3 generating time-series phase data in a range bin of interest based on a range profile indicating, for each range bin, a phase of a reflected wave of a radio wave from a target; phase-rotation-amount time-series data generating section 4 that divides the time-series phase data into segments of a predetermined time length, calculates an amount of phase rotation that occurs in the segments, and generates time-series data on the amount of phase rotation; pattern matching section 6 that performs pattern matching between the generated time-series data on the amount of phase rotation and a template of time-series data on the amount of phase rotation that is defined by a distance and a moving speed; and speed detection section 7 that detects the moving speed of the target based on a result of the pattern matching.

9 Claims, 13 Drawing Sheets

(51) Int. Cl.
*G01S 13/64* (2006.01)
*G01S 13/93* (2006.01)
*G01S 7/40* (2006.01)
*G01S 13/50* (2006.01)

(56) References Cited

U.S. PATENT DOCUMENTS

| | | | | |
|---|---|---|---|---|
| 6,137,439 | A * | 10/2000 | Bradford | G01S 13/003 342/104 |
| 6,798,374 | B1 * | 9/2004 | Smith | G01S 13/536 342/104 |
| 7,259,714 | B1 * | 8/2007 | Cataldo | G01S 13/22 342/104 |
| 7,986,397 | B1 * | 7/2011 | Tiemann | G01S 17/32 356/5.09 |
| 8,860,605 | B2 | 10/2014 | Lellouch et al. | |
| 9,097,791 | B2 * | 8/2015 | Kishigami | G01S 7/285 |
| 9,322,905 | B2 * | 4/2016 | Kishigami | G01S 13/91 |
| 2005/0156780 | A1 * | 7/2005 | Bonthron | G01S 13/343 342/107 |
| 2006/0028369 | A1 * | 2/2006 | Rausch | G01S 7/415 342/22 |
| 2006/0262007 | A1 * | 11/2006 | Bonthron | G01S 13/34 342/70 |
| 2010/0207806 | A1 * | 8/2010 | Takahashi | G01S 13/106 342/109 |
| 2011/0025546 | A1 * | 2/2011 | Cook | G01S 7/2923 342/22 |
| 2011/0279305 | A1 * | 11/2011 | Lellouch | G01S 7/003 342/107 |
| 2014/0085127 | A1 * | 3/2014 | Kishigami | G01S 13/91 342/108 |
| 2016/0084943 | A1 * | 3/2016 | Arage | G01S 7/41 342/102 |

FOREIGN PATENT DOCUMENTS

| | | |
|---|---|---|
| JP | 2616318 B2 | 6/1997 |
| JP | 2003-161779 A | 6/2003 |
| JP | 2012-181109 A | 9/2012 |

OTHER PUBLICATIONS

International Search Report for Application No. PCT/JP2013/003436 dated Jul. 2, 2013.

* cited by examiner

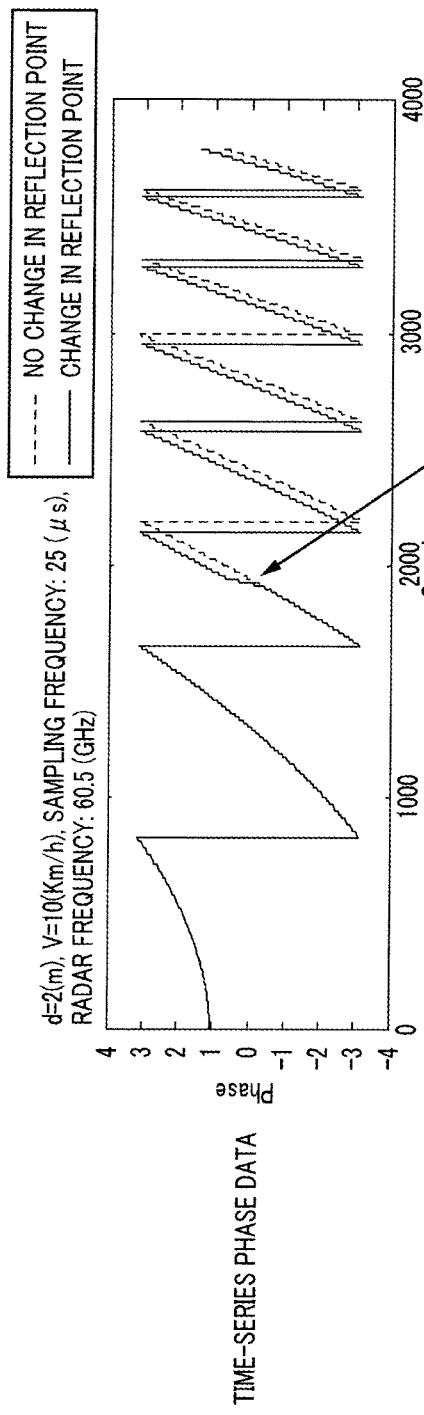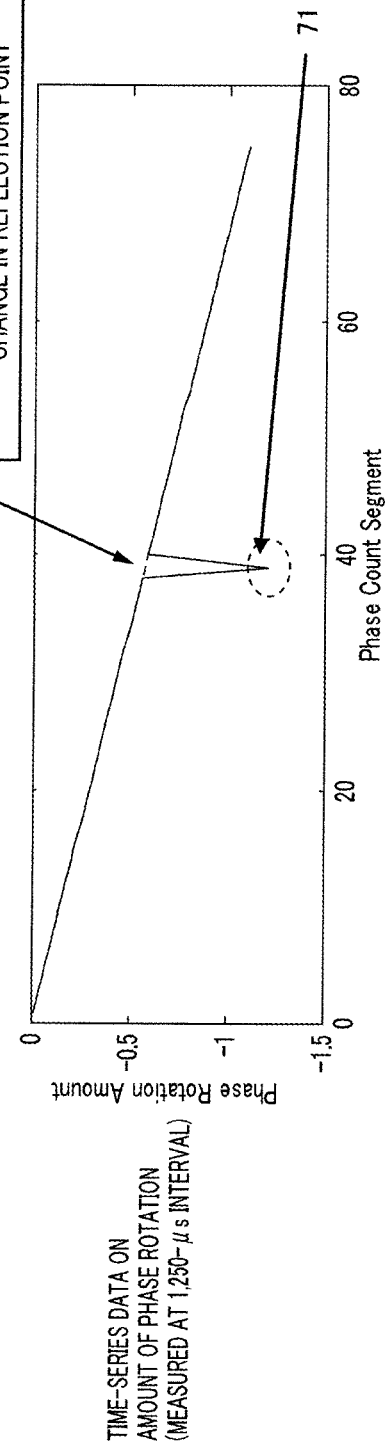
FIG. 5A
FIG. 5B

TIME-SERIES PHASE DATA

| SAMPLING NUMBER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | SEGMENT PERCENTAGE |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| | N | N | N | N | N | N | N | N | Y | Y | Y | Y | N | N | N | N | N | N | Y | Y | N | N | N | N | N | N | N | N | N | N | N | N | Y | Y | Y | Y | N | N | N | N | N | N | N | N | N | N | N | N | N | N | 18% |

TIME-SERIES DATA ON AMOUNT OF PHASE ROTATION

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 2 SAMPLE SEGMENTS | N | | | | N | | | N | | | Y | | | N | | N | | N | | Y | | N | | N | | N | | N | | N | | N | | Y | | Y | | N | | N | | N | | N | | N | | N | | N | 20% |
| 3 SAMPLE SEGMENTS | | N | | | | N | | | Y | | | Y | | | N | | | N | | | Y | | N | | N | | N | | N | | | N | | | Y | | Y | | N | | N | | N | | N | | N | | N | | 25% |
| 4 SAMPLE SEGMENTS | | | N | | | | N | | | Y | | | N | | | N | | | Y | | | N | | N | | | N | | | N | | | N | | | Y | | N | | Y | | N | | N | | N | | N | | | 25% |
| 5 SAMPLE SEGMENTS | | | | N | | | | | Y | | | | N | | Y | | | | | Y | | | | | N | | | | | N | | | | | Y | | | | Y | | | | | N | | | | | | | 50% |
| 10 SAMPLE SEGMENTS | | | | | | | | | | Y | | | | | | | | | | Y | | | | | | | | | | N | | | | | | | | | | Y | | | | | | | | | | N | 60% |

FIG. 7

RADAR SIGNAL PROCESSING APPARATUS, RADAR SIGNAL PROCESSING METHOD, AND RADAR SIGNAL PROCESSING PROGRAM

TECHNICAL FIELD

The present invention relates to a radar signal processing apparatus, a radar signal processing method, and a radar signal processing program for detecting the moving speed of a moving target by emitting a radio wave to the target and detecting a reflected radio wave.

BACKGROUND ART

A traditional radar technique to detect the moving speed of a target is utilization of the Doppler effect. This technique detects the moving speed of a target on the basis of the difference (hereinafter referred to as "Doppler frequency shift") between the frequency of a radio wave transmitted (emitted) to the moving target and the frequency of a radio wave reflected off the target (hereinafter referred to as "reflected wave").

The Doppler effect-based technique however is not capable of detecting the moving speed of the target when a radio wave is emitted in a direction orthogonal to the direction in which the target is moving (hereinafter "orthogonal direction"), because no Doppler frequency shift occurs.

Patent Literature (hereinafter, referred to as "PTL" 1) (hereinafter, referred to as "related art") discloses a technique that detects the moving speed of a target with emission of a radio wave in the orthogonal direction, for example.

FIGS. 1A and 1B are diagrams schematically illustrating the related art. As shown in FIGS. 1A and 1B, the related art uses a radar having an array antenna disposed parallel to the moving direction of target 23. Target 23 is moving at a constant speed from left to right in the drawings. Each antenna element (Akl, Akm . . . ) constituting the array antenna emits radio waves in the orthogonal direction to a lateral surface of target 23 and also detect reflected waves from the target.

In FIG. 1A, dotted lines 24 represent the direction in which reflected waves propagate from target 23 at time t=t1. The term "dlm" indicates the distance (interval) between antenna elements. The reflected wave from target 23 positioned at distance R and angle θ1 at time t=t1 is received by each antenna element. At the time of reception, a radio wave channel path difference of dlm sin θ1 occurs between two given antenna elements, e.g., Akl and Akm. Consequently, reflected waves having a phase difference corresponding to the channel path difference are detected between the two antenna elements.

Similarly, assuming that the angle is θ2 at time t=t2 (t2>t1) in FIG. 1B, reflected waves having a phase difference corresponding to the channel path difference of dlm sin θ2 are detected at Akl and Akm.

In the related art, the moving speed of target 23 can be then determined by calculating the temporal differentiation of the phase difference detected between the two antenna elements.

In determination of the moving speed of target 23, the related art assumes that the position at which the radio wave transmitted from the radar is reflected at target 23 (hereinafter referred to as "reflection position") is the same at times t1 and t2. In other words, the related art assumes that the radio wave is always reflected at the same position on the moving target.

CITATION LIST

Patent Literature

PTL 1
Japanese Patent No. 2616318

SUMMARY OF INVENTION

Technical Problem

Since the related art emits a radio wave to a lateral surface of the target and detects a reflected wave from the surface, however, the reflection position can change as the target moves (hereinafter referred to as "change in the reflection position"). Changes in the reflection position tend to occur especially when the radar is located near the target. As outlined above, when there is a change in the reflection position along with movement of the target, the related art has a problem of being unable to accurately detect the moving speed of the target.

An object of the present invention is to provide a radar signal processing apparatus, a radar signal processing method, and a radar signal processing program capable of accurately detecting the moving speed of a target even with a change in the reflection position resulting from movement of the target.

Solution to Problem

A radar signal processing apparatus according to an aspect of the present invention includes: a time-series phase data generating section that generates time-series phase data based on a range profile indicating, for each range bin, a phase of a reflected wave of a radio wave transmitted to a target moving on a certain path, the time-series phase data indicating through time a phase of the reflected wave in a particular range bin; a phase-rotation-amount time-series data generating section that divides the time-series phase data into segments of a predetermined time length, calculates an amount of phase rotation that occurs in the segments, and generates time-series data on the amount of phase rotation indicative of the amount of phase rotation; a pattern matching section that performs pattern matching between the time-series data on the amount of phase rotation and a template of time-series data on the amount of phase rotation that is defined by a distance from a radar to the path and by a moving speed of the target; and a speed detection section that detects the moving speed of the target based on a result of the pattern matching.

A radar signal processing method according to an aspect of the present invention includes: generating time-series phase data based on a range profile indicating, for each range bin, a phase of a reflected wave of a radio wave transmitted to a target moving on a certain path, the time-series phase data indicating through time a phase of the reflected wave in a particular range bin; dividing the time-series phase data into segments of a predetermined time length, calculating an amount of phase rotation that occurs in the segments, and generating time-series data on the amount of phase rotation indicative of the amount of phase rotation; performing pattern matching between the time-series data on the amount of phase rotation and a template of time-series data on the amount of phase rotation that is defined by a distance from a radar to the path and by a moving speed of the target; and detecting the moving speed of the target based on a result of the pattern matching.

A radar signal processing program according to an aspect of the present invention is a program for causing a computer to execute processing comprising: generating time-series phase data based on a range profile indicating, for each range bin, a phase of a reflected wave of a radio wave transmitted to a target moving on a certain path, the time-series phase data indicating through time a phase of the reflected wave in a particular range bin; dividing the time-series phase data into segments of a predetermined time length, calculating an amount of phase rotation that occurs in the segments, and generating time-series data on the amount of phase rotation indicative of the amount of phase rotation; performing pattern matching between the time-series data on the amount of phase rotation and a template of time-series data on the amount of phase rotation that is defined by a distance from a radar to the path and by a moving speed of the target; and detecting the moving speed of the target based on a result of the pattern matching.

Advantageous Effects of Invention

The present invention can accurately detect the moving speed of the target even when the reflection position changes as the target moves.

BRIEF DESCRIPTION OF DRAWINGS

FIGS. 5A and 5B are superimposed graphs showing time-series phase data for when there is no change in the reflection point and when there is a change in the reflection point;

FIG. 7 shows time-series phase data for when there are changes of the reflection point;

DESCRIPTION OF EMBODIMENTS

Figure 1A:
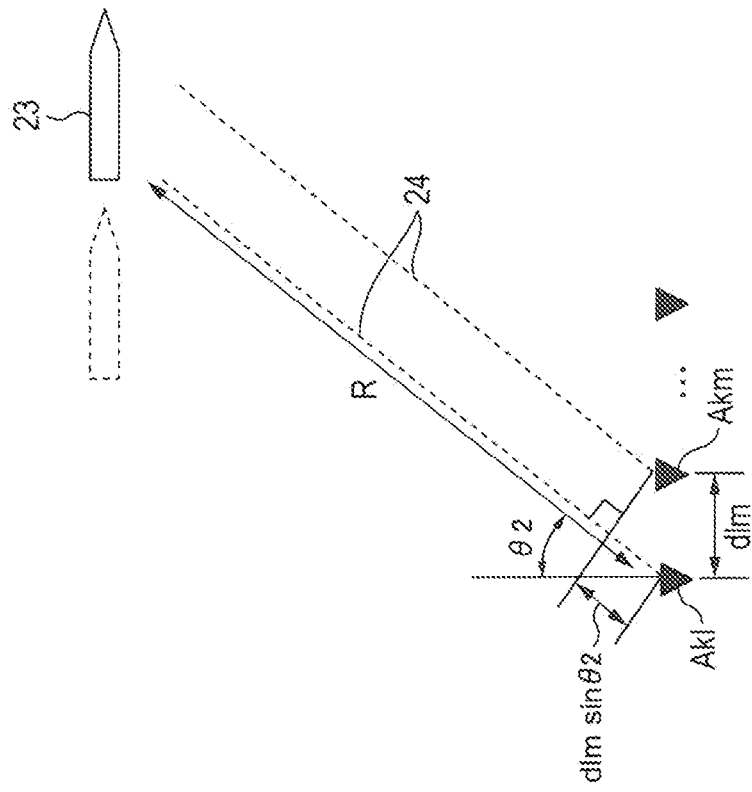
FIGS. 1A and 1B are diagrams for describing how the moving speed is detected in the related art.
Figure 1B:
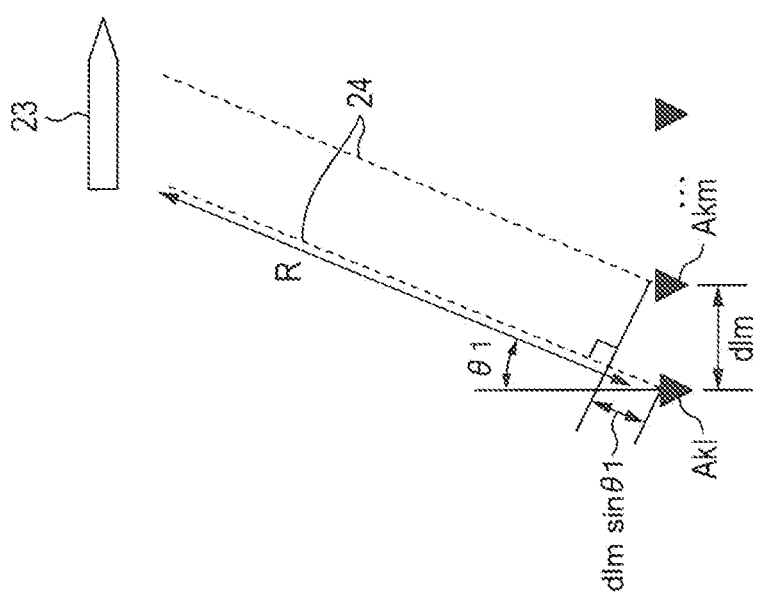

Embodiments of the present invention are described in detail below with reference to the accompanying drawings.

(Fundamentals)

The following descriptions will first discuss basic matters about radar, which is to be described for describing the inventive principle, and then explain the principle on which the present invention relies.

A radar is typically a device that measures the distance to a target by emitting a radio wave to the target and measuring the delay time until the reflected wave from the target is received. For a radar that performs digital processing using an A/D (Analog-to-Digital) converter, the resolution of delay time measurement is a discrete value dependent on the sampling rate of the A/D converter. Accordingly, the resolution of the distance is also a discrete value dependent on the sampling rate of the A/D converter. The unit of distance resolution is generally called range bin. Distance measurement using a radar is typically performed in units of range bins.

Meanwhile, a change in the distance to the target can be determined with a method that relies on a different principle than the aforementioned principle. This method observes Doppler frequency shifts experienced by the reflected wave to be observed by the radar or changes in the phase of the reflected wave resulting from Doppler frequency shifts. The principle of this method is described below.

When the speed of the target relative to the radar antenna is represented as V and the wavelength of the radio wave used by the radar is represented as $\lambda$, Doppler frequency $f_d$ to be observed is generally given by following equation 1:

[1]

$$f_d = \frac{2V}{\lambda} \quad \text{(Equation 1)}$$

The relationship between Doppler frequency shift and phase change is discussed herein. When the phase of the reflected wave from the target is represented as $\phi$ while the angular speed corresponding to the Doppler frequency is represented as $\omega_d$, the relationship below is given by equation 1, where $\Delta t$ is the time interval between measurements and $\Delta \phi$ is the amount of phase change that occurs in $\Delta t$.

[2]

$$\omega_d = \frac{\Delta \phi}{\Delta t} = 2\pi \cdot f_d = 2\pi \cdot \frac{2V}{\lambda} \quad \text{(Equation 2)}$$

Multiplying both sides of equation 2 by $\Delta t$ yields following equation 3, where $\Delta X$ represents the change in the distance to the target that occurs during $\Delta t$.

[3]

$$\Delta \phi = 2\pi \cdot \frac{2V \cdot \Delta t}{\lambda} = 2\pi \cdot \frac{2 \cdot \Delta X}{\lambda} \quad \text{(Equation 3)}$$

Equation 3 indicates that when the distance to the target changes by $\lambda/2$, the phase undergoes one cycle of rotation (i.e., changes by $2\pi$). For a radar that uses 60 GHz as its frequency, for example, the phase of the reflected wave goes through one cycle of rotation every time the distance to the target changes by 2.5 mm. Here, the wavelength of 60 GHz is approximately 5 mm. The present invention employs the relationship between a change in the distance to the target and the phase rotation to determine the moving speed of the target.

Referring to FIGS. 2 to 8, the principle of the present invention will be described.

FIGS. 2A to 2D are diagrams describing how the phase of a reflected wave from the target changes during detection of the moving speed of the target by emitting a radio wave to the target in the orthogonal direction and receiving a reflected wave from the target according to the present invention.

Figure 2A:
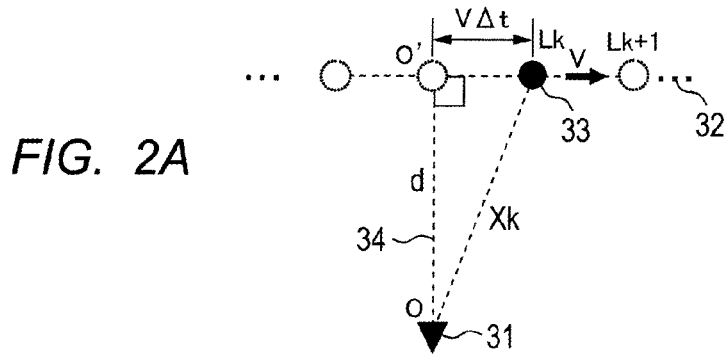
FIGS. 2A to 2D illustrate how the phase of a reflected wave from a target changes.

As illustrated in FIG. 2A, in the illustrated example, target 33 moves on straight line path 32 at a distance of d(O–O') from antenna 31 of a radar. Target 33 is assumed to be a point having no magnitude. In FIG. 2A, reference numeral 34 represents a normal drawn from antenna 31 to path 32. Distance d is the length of normal 34.

Figure 2B:
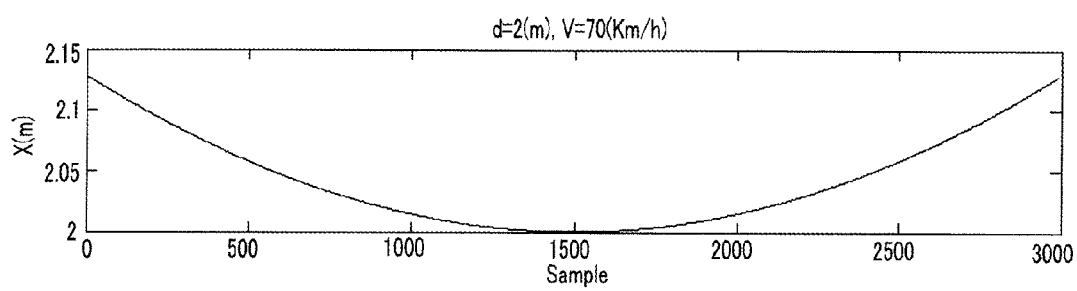

In a short time period, target 33 can be considered to be in linear motion at a constant speed on path 32. When the moving speed of target 33 in this state is represented as V and the phase of the reflected wave from target 33 is observed at time intervals Δt, the position at which target 33 is observed can be considered to be a set of points spaced at interval VΔt on path 32. When the position of target 33 at time T=$T_k$ is represented as $L_k$ and the distance from antenna 31 to target 33 is represented as $X_k$ ($OL_k$), $X_k$ can be uniquely determined as a function of moving speed V and d according to the Pythagorean theorem. As an example, FIG. 2B illustrates how distance X changes when d=2 (m) and V=70 (Km/h). In FIG. 2B, the horizontal axis represents k, the subscript of $X_k$. The position of target 33 at k=1,500 shown in FIG. 2B is the position O' in FIG. 2A.

From equation 3, the phase of the reflected wave from target 33 is given by:
[4]

$$\phi = 2\pi \times \frac{2 \cdot X_k}{\lambda} + \phi_0 \quad \text{(Equation 4)}$$

Figure 2C:
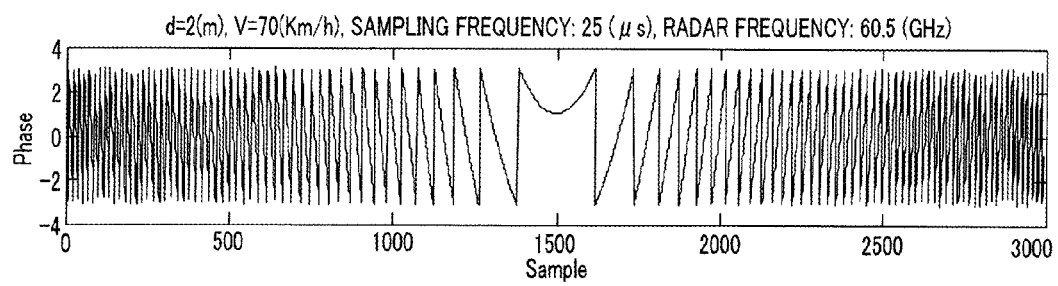

In equation 4, $\phi_0$ is the initial phase, which is a constant. By way of example, if the frequency used by the radar is 60 GHz (λ≈5 (mm)), the phase of the reflected wave from target 33 changes as illustrated in FIG. 2C in response to the change in distance X shown in FIG. 2B. For the sake of simplicity, FIG. 2C assumes $\phi_0$=0. The phase is represented by a value between −3.14 (−π) and 3.14 (π). Hereinbelow, a phase data sequence for a reflected wave observed at measurement time interval Δt under such conditions will be referred to as "time-series phase data". Although the phase value of the reflected wave from target 33 appears to steeply change near −π and π, this is attributed to denotation of the phase between −π and π; the phase actually does not steeply change.

Figure 2D:
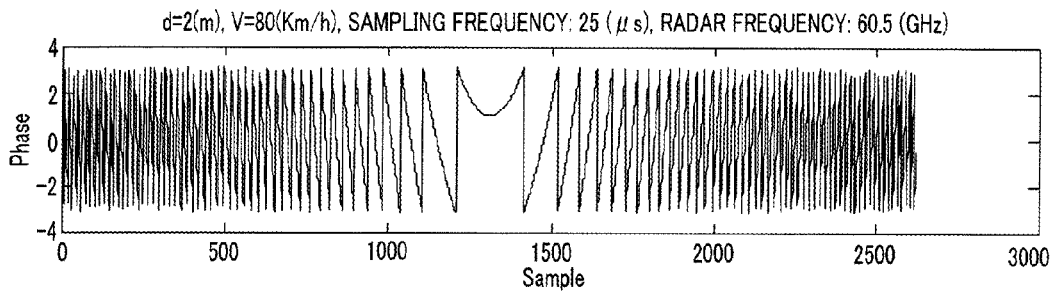

FIG. 2D illustrates time-series phase data observed when the target 33 moves in the same segment as FIG. 2C at the speed V=80 (Km/h). In FIG. 2D, because target 33 is moving at a high speed, a change in phase rotation that occurs in each unit time is greater than the case of FIG. 2C. Thus, time-series phase data is a function of the distance d to target 33 and the moving speed V of target 33; time-series phase data is uniquely determined from d and V. Meanwhile, distance d is uniquely determined for an each individual range bin, for example. Therefore, multiple values of moving speed V are assumed for distance d and prepared as time-series phase data templates. The degree of similarity (correlation) between actually observed time-series phase data and each template is then calculated, and the moving speed V used for generation of the template having the highest similarity is considered to be the result of detection of the target's moving speed. What has been described so far is the basic principle of the method for detecting the moving speed of the target based on a reflected wave from a lateral surface of the target through pattern matching against templates.

Figure 3A:
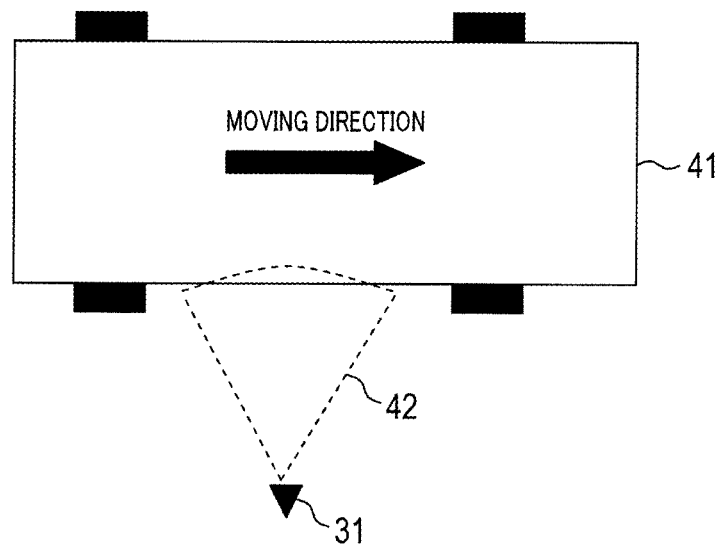
FIGS. 3A and 3B are top and side views illustrating positioning of a radar antenna.
Figure 3B:
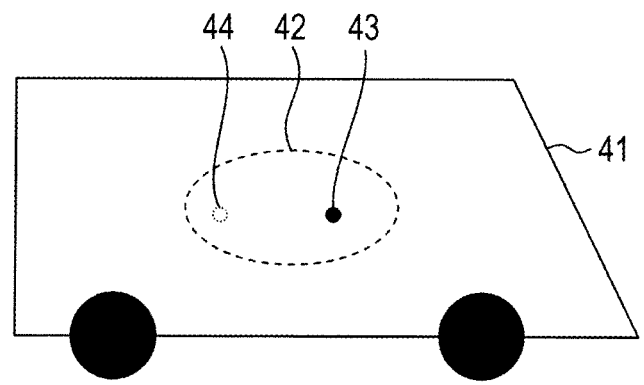

While target 33 is described as being a point, the target needs to be considered to have a magnitude rather than being a point in many actual scenarios. This will be described in detail using the example of FIGS. 3A and 3B. In the example of FIGS. 3A and 3B, a vehicle is illustrated as an example of the moving target. FIG. 3A is a top view illustrating antenna 31 of the radar positioned so that a radio wave is emitted to a lateral surface of moving vehicle 41 and a reflected wave therefrom is received. FIG. 3B depicts one lateral surface of vehicle 41 under such a condition. In FIGS. 3A and 3B, the distance from antenna 31 to vehicle 41 is assumed to be several meters.

A case where vehicle 41 is larger than emission range 42 of the radio wave from the radar as illustrated in FIGS. 3A and 3B will be discussed. Surfaces of vehicle 41 generally have several points at which reflection of a radio wave is locally strong, such as projections like door knobs or body seams. Let us suppose that reflection point 43 in FIG. 3A is the point at which the radio wave is reflected most strongly at a given time (hereinafter "reflection point"). When vehicle 41 then moves forward (from left to right in the figure), it is very likely that the position of emission range 42 of the radio wave on vehicle 41 changes and the reflection point shifts from reflection point 43 to 44.

Figure 4A:
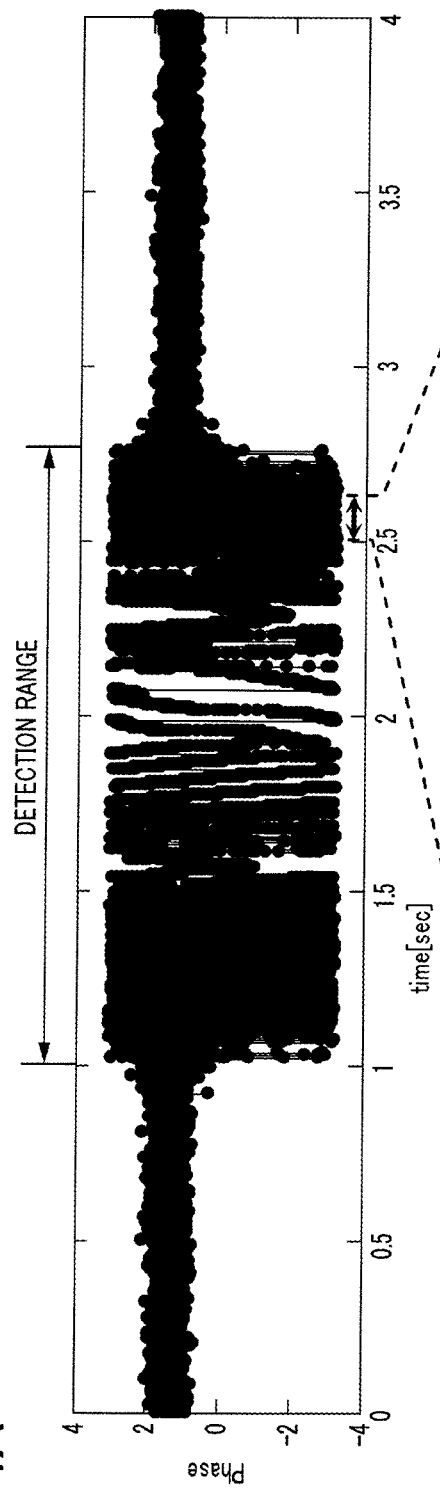
FIGS. 4A and 4B are diagrams in which time-series phase data while the vehicle runs are plotted.
Figure 4B:
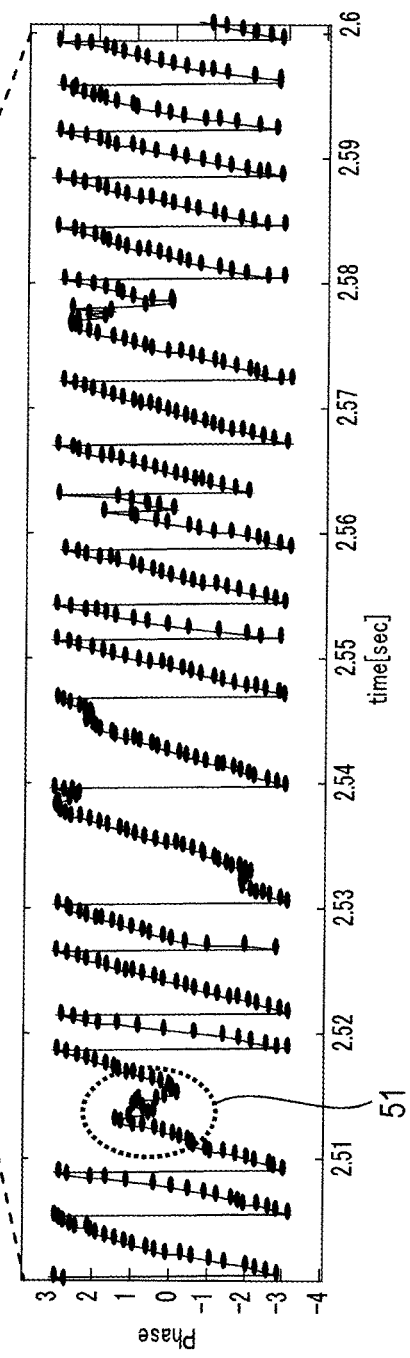

FIG. 4A is a plot of time-series phase data during moving of the vehicle obtained under the radar installation conditions shown in FIGS. 3A and 3B. FIG. 4B is a partial enlarged view of FIG. 4A.

In FIG. 4B, the phase of the reflected wave from the target basically increases monotonously. However, at some points, the phase of the reflected wave from the target exhibits such a change as once decreasing and then increasing again, like the portion surrounded by ellipse 51. This represents an example of the phenomenon resulting from change in the distance from the radar antenna to the reflection point along with moving of the vehicle as mentioned above, indicating that changes in the reflection point actually occur.

Next, effects of change in the reflection point on detection of the moving speed will be discussed. FIG. 5A is a graph showing both time-series phase data for a case with no change in the reflection point and time-series phase data for a case with a change in the reflection point in the vicinity of 2,000 samples on the horizontal axis. The time-series phase data shown in FIG. 5A are data observed while the target 33 moves on path 32 from left to right in the figure with the distance d=2 (m) in FIG. 2A, for example. The moving range of target 33 in this case is between 0 and 15 degrees of the angle formed by normal 34 (the broken line indicated as distance d) and the line connecting antenna 31 with target 33 (the broken line indicated as distance $X_k$).

As can be seen from FIG. 5A, the time-series phase data for a case with no change in the reflection point and the time-series phase data for a case with a change in the reflection point do not overlap after the change in the reflection point. In other words, the similarity in the waveforms of the two time-series phase data is lost upon the change in the reflection point.

As a result, the time-series phase data for when there is a change in the reflection point does not have similarity to a template representing the actual moving speed of the target, making it impossible to accurately detect the moving speed.

The present inventors thus realized that there is a need for a data sequence that is less likely to lose waveform similarity even with a change in the reflection point and devised generation of time-series data on the amount of phase rotation. The following description shows how time-series data on the amount of phase rotation can be generated.

Time-series data on the amount of phase rotation is data produced by segmenting time-series phase data into segments of a predetermined time length and measuring the amount of phase rotation that occurs in each segment. Time-series phase data is sampled at fixed time intervals. In other words, time-series data on the amount of phase rotation is data generated by dividing time-series phase data in blocks of a predetermined number of samples (equivalent to the predetermined time length, referred to as "segment") and measuring the amount of phase rotation that occurs in each segment.

This is described with a specific example. Assume that time-series phase data Time_series_$\phi$ is represented by following equation 5:

[5]

$$\text{Time\_series\_}\phi=\{\phi(T_1),\phi(T_2),\phi(T_3),\phi(T_4),\phi(T_5),\phi(T_6),\ldots\} \quad \text{(Equation 5)}$$

Assuming that the number of samples equivalent to the predetermined time length is three, time-series data on the amount of phase rotation Time_series_$\Delta\phi$ is generated as following equation 6:

[6]

$$\text{Time\_series\_}\Delta\phi=[\{\phi(T_2)-\phi(T_1)\}+\{\phi(T_3)-\phi(T_2)\},\{\phi(T_4)-\phi(T_3)\}+\{\phi(T_5)-\phi(T_4)\},\ldots] \quad \text{(Equation 6)}$$

Figures 6A, 6B, 6C:
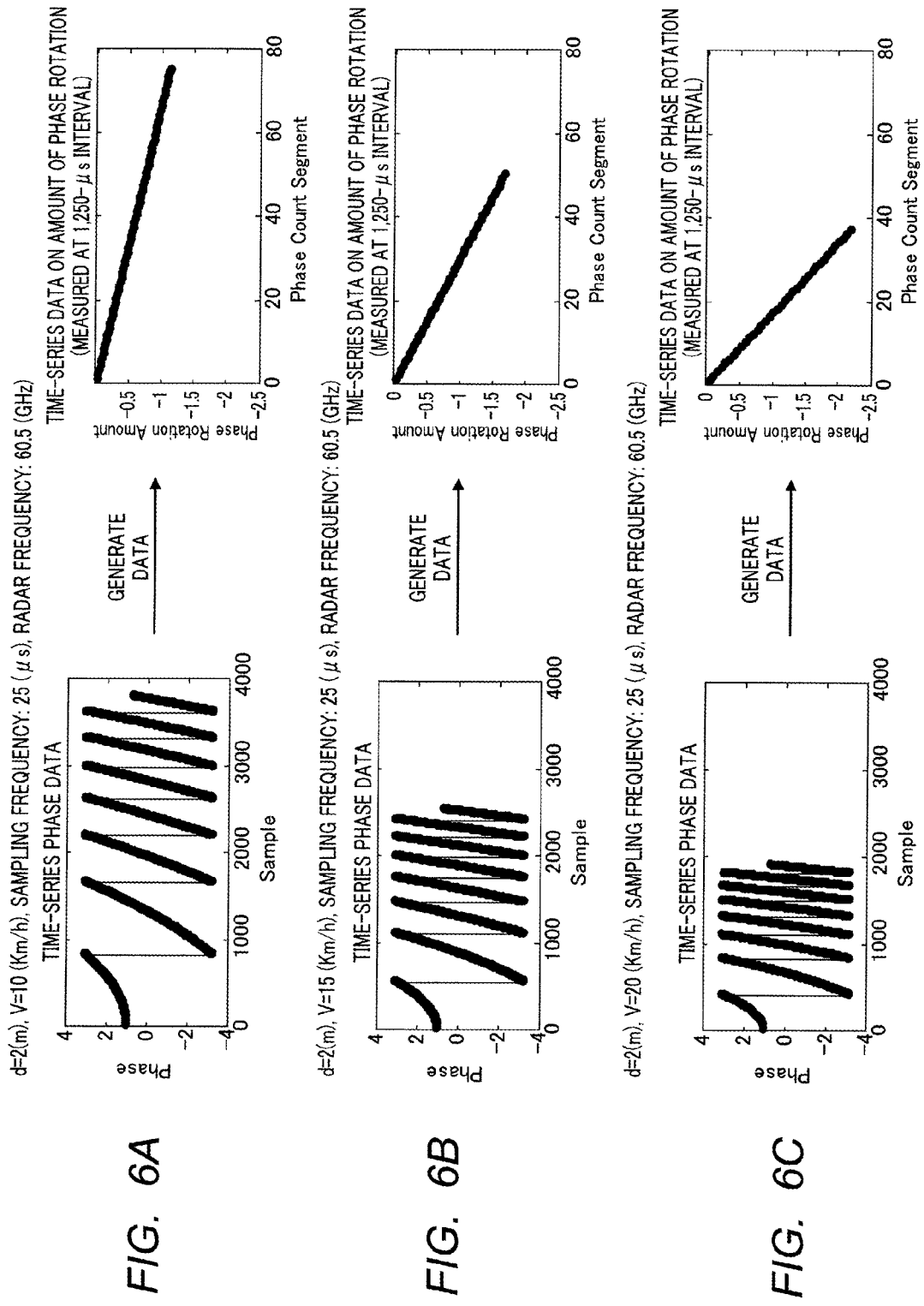
FIGS. 6A, 6B and 6C show time-series data on the amount of phase rotation.

An exemplary generation of time-series data on the amount of phase rotation from time-series phase data will be illustrated with FIGS. 6A to 6D. FIGS. 6A, 6B, and 6C show the original time-series phase data on the left and generated time-series data on the amount of phase rotation on the right, respectively. The time-series phase data shown in FIGS. 6A to 6C are data observed when target 33 moves on path 32 from left to right in the figure when distance d=2 (m) in FIG. 2A. The moving range of target 33 in this case is between 0 and 15 degrees of the angle formed by normal 34 (the broken line indicated as distance d) and the line connecting antenna 31 with target 33 (the broken line indicated as distance $X_k$) as mentioned above. The time-series data on the amount of phase rotation shown in FIGS. 6A to 6C are generated by dividing the time-series phase data shown in FIGS. 6A to 6C into segments each having a length of 50 samples (=1,250 μs as the sampling period of the radar for phase acquisition is 25 μs) and then measuring the amount of phase rotation occurred in each segment.

FIGS. 6A to 6C are different only in the moving speed of the target: 10 (Km/h) in FIG. 6A; 15 (Km/h) in FIG. 6B; and 20 (Km/h) in FIG. 6C. It can be seen that difference in the moving speed of the target results in difference in waveforms (mainly slopes) of time-series data on the amount of phase rotation. Time-series data on the amount of phase rotation also represents a waveform that is uniquely determined from the distance to the target and the target's moving speed as with time-series phase data. While the above example described the time-series phase data as being segmented into certain segments (or a time length) such that the segments do not temporally overlap, the data may be segmented such that some segments overlap.

FIG. 5B shows graphs of time-series data on the amount of phase rotation generated from the two time-series phase data shown in FIG. 5A together. That is, FIG. 5B shows time-series data on the amount of phase rotation generated from the time-series phase data for when there is no change in the reflection position over time-series data on the amount of phase rotation generated from the time-series phase data for when there is a change in the reflection point. In FIG. 5B, the two graphs of time-series data on the amount of phase rotation precisely overlap except for the point encircled by ellipse 71 (the segment including the timing at which the reflection point changed) regardless of whether there is a change in the reflection point or not. This means that compared with time-series phase data, time-series data on the amount of phase rotation has the property of being less likely to lose waveform similarity even with a change in the reflection point.

A feature of the present invention is use of time-series data on the amount of phase rotation in the pattern matching process described later, instead of time-series phase data. As mentioned above, time-series data on the amount of phase rotation has the property of being less likely to lose waveform similarity even with a change in the reflection point. This makes it possible to detect the moving speed of the target robustly against changes in the reflection point.

Next, policies relating to how to determine the predetermined time length (or segments) with which time-series phase data is segmented in generation of time-series data on the amount of phase rotation will be described.

At the point indicated by ellipse 51 in FIG. 4B, a change in the reflection point does not end within two consecutive samples but takes place through multiple samples. The length of time required for the reflection point to the change depends on the shape and moving speed of the target, or the like.

Let us consider a situation where a change in the reflection point takes place through a number of samplings in time-series phase data, using time-series phase data represented in a tabular format. The upper portion of FIG. 7 represents time-series phase data; and the lower portion shows whether a change reflection point is included in individual segments or not after the time-series phase data of the upper portion is segmented by a predetermined time length, i.e., a predetermined number of samples (segments). In the lower portion of FIG. 7, the resulting segments are denoted as "sample segments." In FIG. 7, the letter "N" means there is no change the reflection point in that sampling, while the symbol "Y" means that there is a change in the reflection point in that sampling.

As shown in the example of FIGS. 5A and 5B, when a change in the reflection point occurred, the amount of phase rotation in the corresponding segment of the timing assumes a different value than when there is no change in the reflection point, but the amount of phase rotation in the other segments remains the same as when there is no change in the reflection point. That is, when a change in the reflection point is present only in one segment, it does not affect the other segments. Hence, in order to confine the effect of change in the reflection point to a single segment, the time length needs to be longer than the duration of change in the reflection point.

The predetermined time length being too long leads to adverse effects, however. As mentioned above, the lower portion of FIG. 7 is an exemplary representation of whether a change in reflection point is included in individual sample segments or not with "N" and "Y" symbols with the time length by which to divide time-series phase data, i.e., the number of samples (sample segment), varied as 2, 3, 4, 5, and 10. As the lower portion of FIG. 7 indicates, as the number of sample segments increases, the proportion of segments in which phase change is discontinuous ("Y" segments) to the entire time-series data on the amount of phase rotation increases. This implies that the property of time-series data on the amount of phase rotation, that is, the property of being less likely to lose waveform similarity in response to a change in the reflection point, becomes difficult to be gained as the time length increases.

From the foregoing, the maximum value of the time length optimum for achieving the effect of the present invention, that is, "the ability to detect the moving speed of the target robustly against changes in the reflection point," is desirably the duration of a change in the reflection point. The duration of a change in the reflection point is determined by the shape and moving speed of the target, for example. Thus, when the present invention is implemented, an experiment on the target can be conducted in advance to statistically determine the duration of the change in the reflection point, and the time length for generating time-series data on the amount of phase rotation can be established according to the duration.

As described, the present invention optimizes the time length as appropriate for the shape of the target and the range of the moving speed of the target to be detected. The present invention thereby maximizes the effect of being able to detect the moving speed of the target robustly against changes in the reflection point on the target. While the time length determined by the above described method is a time length with which the above described effect can be achieved most easily, the present invention is not limited to this time length.

The foregoing is the description of the underlying principle of the present invention. The inventors have found out the above described principle from consideration. The inventors then made use of the principle to realize an apparatus and method capable of accurately detecting the moving speed of the target even when there is a change in the reflection point on the target as the target moves. Examples of the apparatus and method will be now described.

Embodiment 1

Figure 8:
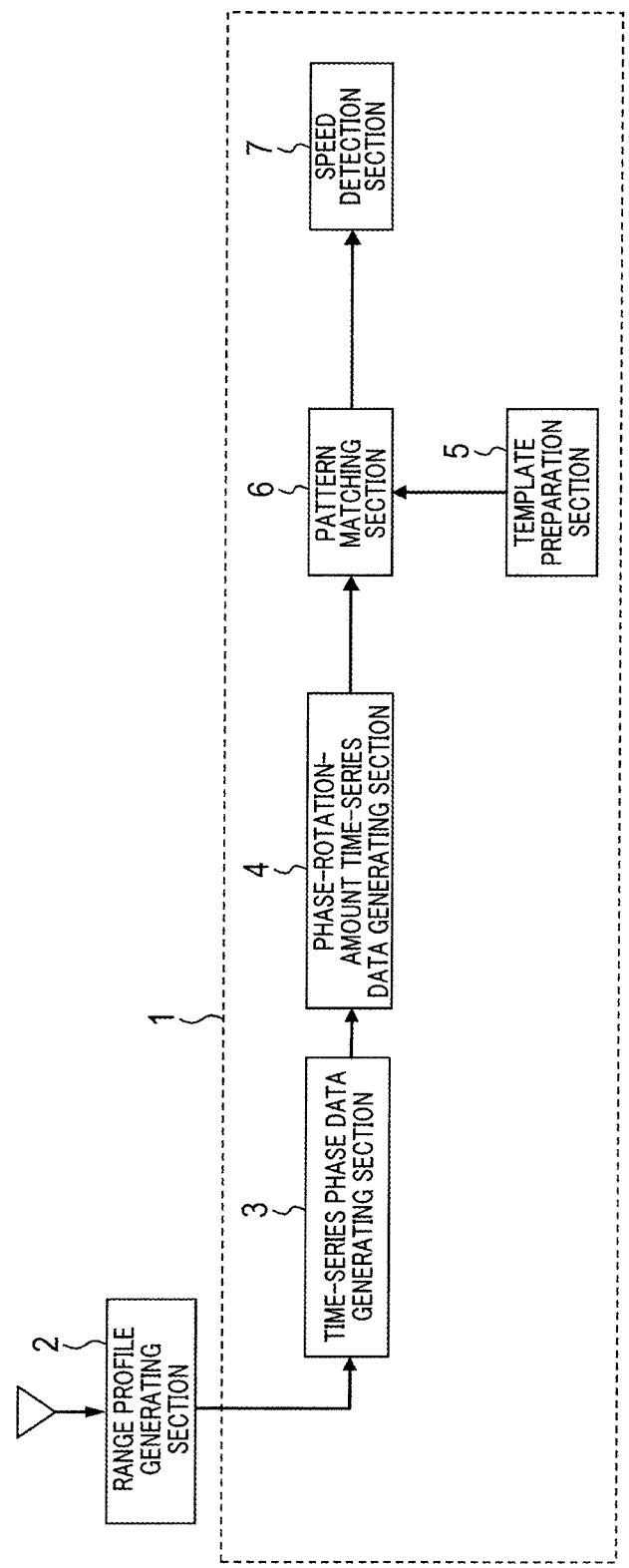
FIG. 8 is a block diagram illustrating a radar signal processing apparatus and peripheral components according to Embodiment 1 of the present invention.

FIG. 8 is a block diagram showing radar signal processing apparatus 1 and associated components in Embodiment 1 of the present invention. In FIG. 8, radar signal processing apparatus 1 includes time-series phase data generating section 3, phase-rotation-amount time-series data generating section 4, template preparation section 5, pattern matching section 6, and speed detection section 7.

Time-series phase data generating section 3 generates time-series phase data for a particular range bin (hereinafter referred to as "range bin of interest") based on a range profile output from range profile generating section 2. How range profiles and time-series phase data are generated is described later.

Phase-rotation-amount time-series data generating section 4 generates time-series data on the amount of phase rotation for the range bin of interest based on the time-series phase data generated by time-series phase data generating section 3. Time-series data on the amount of phase rotation can be generated in the above-described manner.

Template preparation section 5 prepares templates for time-series data on the amount of phase rotation that are defined for different values of distance d and moving speed V of the target.

Pattern matching section 6 evaluates the similarity between the time-series data on the amount of phase rotation generated by phase-rotation-amount time-series data generating section 4 and a plurality of pieces of time-series data on the amount of phase rotation serving as templates prepared by template preparation section 5, which is called a pattern matching process. Pattern matching section 6 then outputs a similarity evaluation value as the result of pattern matching process. Pattern matching section 6 repeats the process of comparing time-series data on the amount of phase rotation corresponding to the range bin of interest (one range bin) against all time-series data on the amount of phase rotation prepared as templates for all range bins.

Speed detection section 7 extracts (identifies) the template having the highest similarity based on the similarity evaluation value output by pattern matching section 6. Speed detection section 7 then outputs the moving speed of the target indicated by the highest similarity template as the result of detection.

Although range profile generating section 2 is a component external to radar signal processing apparatus 1, it is described herein as it is important for understanding the operation of radar signal processing apparatus 1. Range profile generating section 2 is a component of a radar, for example.

Range profile generating section 2 outputs range profiles observed at certain time intervals to time-series phase data generating section 3. A range profile is data indicating the amplitude and phase of the reflected wave for each range bin as observed by the radar. The amplitude and phase of a reflected wave are generally represented using an in-phase signal component (I signal) and a quadrature signal component (Q signal). Accordingly, the present description assumes that a range profile output by range profile generating section 2 is I signal and Q signal for each range bin. Use of I signal and Q signal for representing range profiles is not a limitation, as a matter of course. For example, the phase for each range bin may be output in the form of an angle value from range profile generating section 2 to time-series phase data generating section 3.

When the time interval at which range profiles are observed is represented as $\Delta t$, the value of $\Delta t$ needs to be determined as a design value in accordance with the maximum moving speed of the target that can be detected by radar signal processing apparatus 1. Specifically, $\Delta t$ is predefined so as to satisfy equation 7 below. Equation 7 is a condition under which the Nyquist's sampling theorem holds with respect to Doppler frequency $f_d$ that occurs with movement of the target.

[7]

$$f_s = \frac{1}{\Delta t} \geq 2 \times f_d \quad \text{(Equation 7)}$$

I signal and Q signal for the nth range bin in a range profile observed at time $T=T_k$ are denoted as $I(n, T_k)$ and $Q(n, T_k)$, respectively. Then, the phase $\phi(n, T_k)$ of the reflected wave from the target present at the distance corresponding to the nth range bin is defined by following equation 8:

[8]

$$\phi(n, T_k) = \arctan\left(\frac{Q(n, T_k)}{I(n, T_k)}\right) \quad \text{(Equation 8)}$$

Range profiles output from range profile generating section 2 to time-series phase data generating section 3 may be real-time range profiles observed by the radar. Range profiles may also be range profiles that were observed in the past at the radar and recorded as electronic data.

Figure 9:
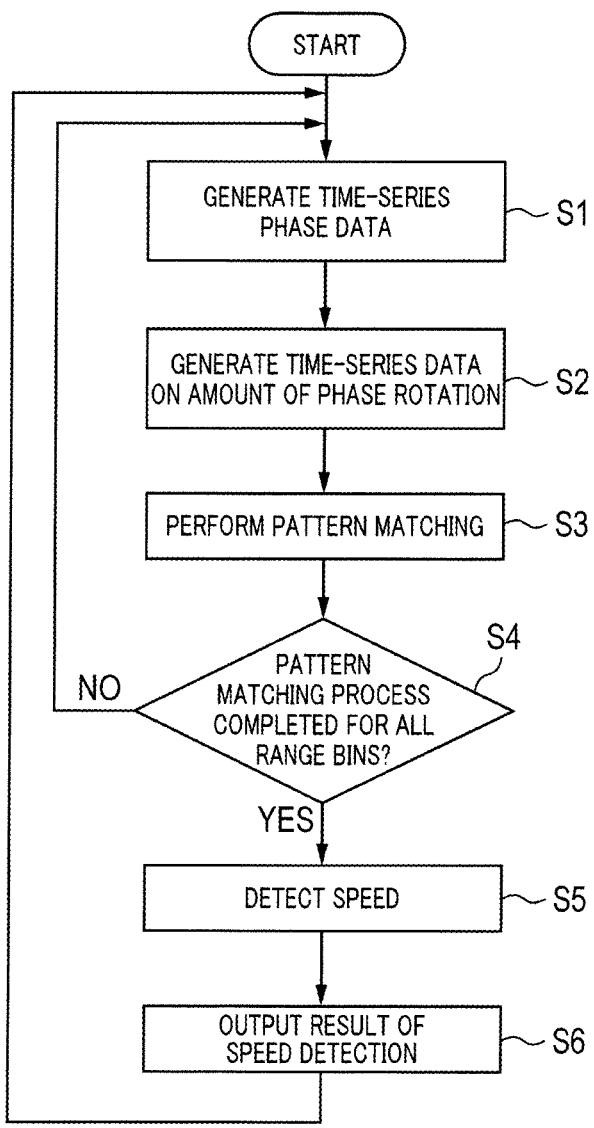
FIG. 9 is a flowchart illustrating the operation of the radar signal processing apparatus in Embodiment 1.
Figure 10:
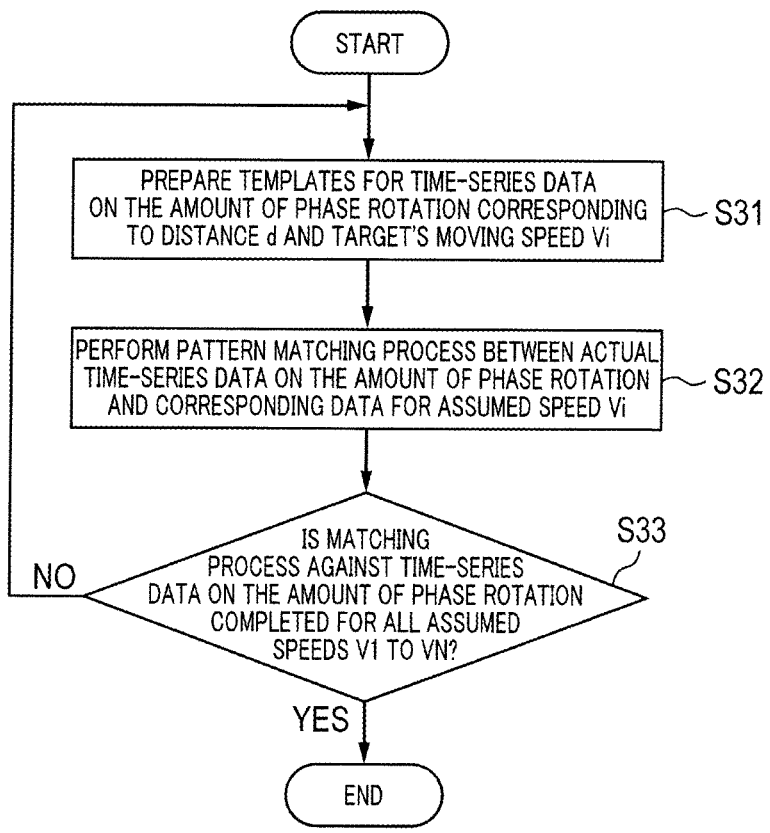
FIG. 10 is a flowchart illustrating detailed actions in pattern matching.

FIG. 9 is a flowchart illustrating the operation of radar signal processing apparatus 1 in Embodiment 1; and FIG. 10 is a flowchart illustrating the detailed operations of the pattern matching process (step S3) shown in FIG. 9. Referring to the flowcharts of FIGS. 9 and 10, the operation of radar signal processing apparatus 1 will be described.

At step S1, time-series phase data generating section 3 conducts time-series phase data generation process. Specifically, time-series phase data generating section 3 generates time-series phase data for the range bin of interest based on range profiles from range profile generating section 2. The time-series phase data for the range bin of interest is time-series phase data obtained with n being set to a particular value in above described equation 8. Time-series phase data generating section 3 then outputs time-series phase data for the range bin of interest to phase-rotation-amount time-series data generating section 4.

At step S2, phase-rotation-amount time-series data generating section 4 performs a process to generate time-series data on the amount of phase rotation. Specifically, phase-rotation-amount time-series data generating section 4 generates time-series data on the amount of phase rotation for the range bin of interest based on the time-series phase data from time-series phase data generating section 3. Phase-rotation-amount time-series data generating section 4 outputs the time-series data on the amount of phase rotation for the range bin of interest to pattern matching section 6.

At step S3, pattern matching section 6 performs a pattern matching process. The pattern matching process at step S3 is described below using the flowchart of FIG. 10.

At step S31, template preparation section 5 prepares templates for time-series data on the amount of phase rotation corresponding to the distance d corresponding to the range bin of interest determined at step S1 in FIG. 9 and the moving speed of the target, Vi (i=1 to N).

Step S31 is described in greater detail. As described above, time-series data on the amount of phase rotation observed when there is no change in the reflection point on target 33 is defined by the distance d from antenna 31 to path 32 and the moving speed V of target 33. Distance d is defined according to the range bin of interest determined at step S1. For example, if n=1 in equation 8, distance d is 0.3 m.

For moving speed V, if the required specification for radar signal processing apparatus 1 includes, for example: moving speed range: 10 to 40 (Km/h), and moving speed resolution: 1 (Km/h) or less, templates to be prepared should similarly have the moving speed range of 10 to 40 (Km/h) and a moving speed interval of 1 (Km/h) or less. Hereinafter, the moving speeds of the target for which templates are prepared will be referred to as "assumed speed." Template preparation section 5 prepares templates for time-series data on the amount of phase rotation for different assumed speeds at the range bin of interest. Templates for different assumed speeds are prepared beforehand and stored in memory.

Instead of being stored in memory, templates may be calculated when they are required in the pattern matching process at a later stage. Also, as described later, outside the range in which the radar can detect the target (hereinafter referred to as "radar detection range"), the phase of noise is observed rather than the reflected wave from the target. For this reason, templates have to be prepared within the radar detection range.

At step S32, pattern matching section 6 performs a pattern matching process between actual time-series data on the amount of phase rotation and time-series data on the amount of phase rotation for assumed speed Vi. Actual time-series data on the amount of phase rotation is data generated by phase-rotation-amount time-series data generating section 4 based on results of actual measurement (or range profiles). Meanwhile, time-series data on the amount of phase rotation for assumed speed Vi is a template prepared by template preparation section 5 for each assumed speed. Pattern matching section 6 then outputs a similarity evaluation value to speed detection section 7 as the result of pattern matching process. The similarity evaluation value may be SAD (Sum of Absolute Difference) for example, although the similarity evaluation value may be SAD is not limited to SAD.

At step S33, pattern matching section 6 determines whether the pattern matching process between the actual time-series data on the amount of phase rotation and prepared time-series data on the amount of phase rotation has been performed for all assumed speeds.

If it is determined at step S33 that pattern matching process has not been completed for all assumed speeds (S33: NO), the flow returns to step S31. If it is determined at step S33 that pattern matching process has been completed for all assumed speeds (S33: YES), the flow ends, after which it returns to the flowchart of FIG. 9.

That is, through the loop at step S33 in FIG. 10, the pattern matching process using all the templates prepared by template preparation section 5 is completed.

The phase for the range bin representing a distance different from the distance to the actual target, that is, a distance at which the target is not present, is a random value because it is not the phase of the reflected wave from the target but the phase of noise. The time-series data on the amount of phase rotation accordingly exhibits a random waveform such as irregularly oscillating up and down. Such time-series data on the amount of phase rotation does not have high similarity to time-series data on the amount of phase rotation as a template.

Figure 11A:
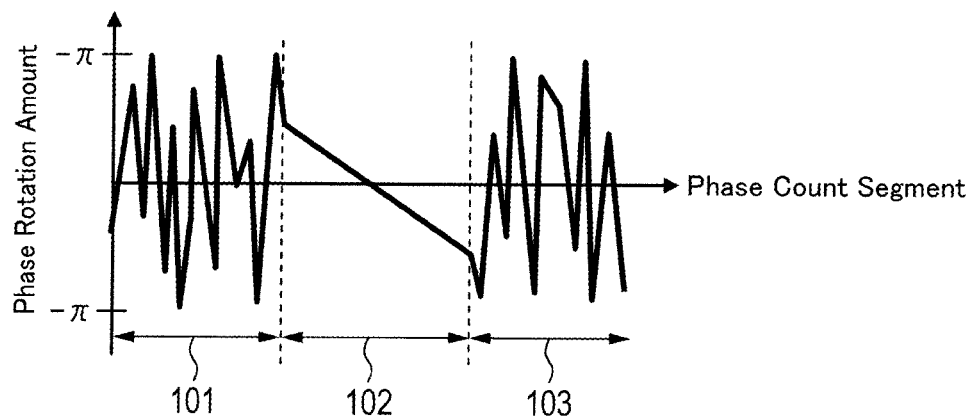
FIGS. 11A and 11B illustrate time-series data on the amount of phase rotation for range bins representing the distances at which the target passes and templates for time-series data on the amount of phase rotation for each assumed speed.
Figure 11B:
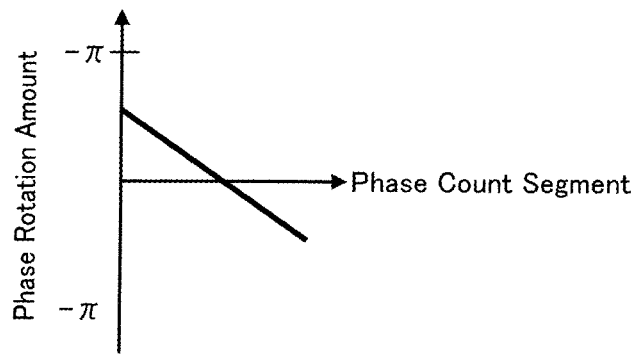

Time-series data on the amount of phase rotation for the range bin corresponding to the distance when the target passes through the detection range of the radar (antenna) (d in the case of FIG. 2A) is shown in FIG. 11A. In FIG. 11A, reference numerals 101 and 103 indicate data on the amount of phase rotation for when the target is positioned outside the detection range of the radar, and these data represent the amount of phase rotation of noise. In contrast, shown at 102 is phase-rotation-amount data for the reflected wave from the target, not the amount of phase rotation of noise. For determination of the moving speed of the target, it is necessary to evaluate the similarity between region 102 and templates for time-series data on the amount of phase rotation for each assumed speed shown in FIG. 11B. To this end, pattern matching section 6 calculates similarity evaluation values while scanning the waveforms of templates in the horizontal axis direction of time-series data on the amount of phase rotation. Pattern matching section 6 then outputs the evaluation value at the position where the highest similarity is obtained as the result of scanning to speed detection section 7 as the evaluation value against the current template. Similarity increases as the actual moving speed of the target becomes closer to the assumed speed indicated by a template.

The pattern matching process at step S3 has been thus far described.

At step S4, pattern matching section 6 determines whether the pattern matching process has been completed for all range bins of interest or not.

If it is determined at step S4 that the pattern matching process has not been performed for all range bins of interest (S4: NO), the flow returns to step S1. If it is determined at step S4 that the pattern matching process has been completed (S4: YES), the flow proceeds to step S5.

That is, through the loop at step S4, the actions in steps S1 to S3 in FIG. 9 are performed for all range bins.

At step S5, speed detection section 7 performs a speed detection process. Specifically, speed detection section 7 extracts the template having the highest similarity based on all similarity evaluation values obtained through the process up to step S4. All similarity evaluation values as described here are evaluation values of similarity of the actual time-series data on the amount of phase rotation to time-series data on the amount of phase rotation for all range bins and all assumed speeds.

At step S6, speed detection section 7 performs a detection result output process. Specifically, speed detection section 7 outputs the assumed speed indicated by the extracted template having the highest similarity as the detection result for the moving speed of the target.

The above described process did not employ a threshold or the like for the similarity evaluation value. Thus, speed detection section 7 would output a detection result based on similarity with noise even when the target is not passing through the detection range. In order to avoid this, a threshold for the similarity evaluation value may be established and speed detection section 7 may be designed to operate as described below. If similarity to the template with the highest similarity is below the threshold, speed detection section 7 is configured to regard it as a meaningless state (i.e., the target is not passing through the detection range) and not detect the moving speed of the target.

Further, as mentioned above, the phase for the range bin representing a distance different from the distance to the actual target, that is, a distance not relevant to the target, is not the phase of the reflected wave from the target but is the phase of noise and is a random value. The time-series data on the amount of phase rotation accordingly also exhibits a random waveform. Similarity between such time-series data on the amount of phase rotation and time-series data on the amount of phase rotation as a template is not high. Therefore, as additional information for use in extracting the highest similarity template in order to determine the moving speed, the distance from the radar to the target could be determined from information on the range bin for the template.

As described, radar signal processing apparatus 1 in this embodiment is characterized by using time-series data on the amount of phase rotation instead of time-series phase data for pattern matching process against templates. The time-series data on the amount of phase rotation has the property of being less likely to lose waveform similarity even with change in the reflection point. This enables radar signal processing apparatus 1 in this embodiment to accurately detect the moving speed of the target even when a change in the reflection point occurs as the target moves.

The related art mentioned above utilizes an array antenna and thus requires receivers, A/D converters and the like, so that there arises a problem in that the costs of radar increase with an increase in the number of antennas. In contrast, the embodiment of the present invention described above does not require use of an array antenna, so that the costs of radar can be reduced.

Embodiment 2

Figure 12:
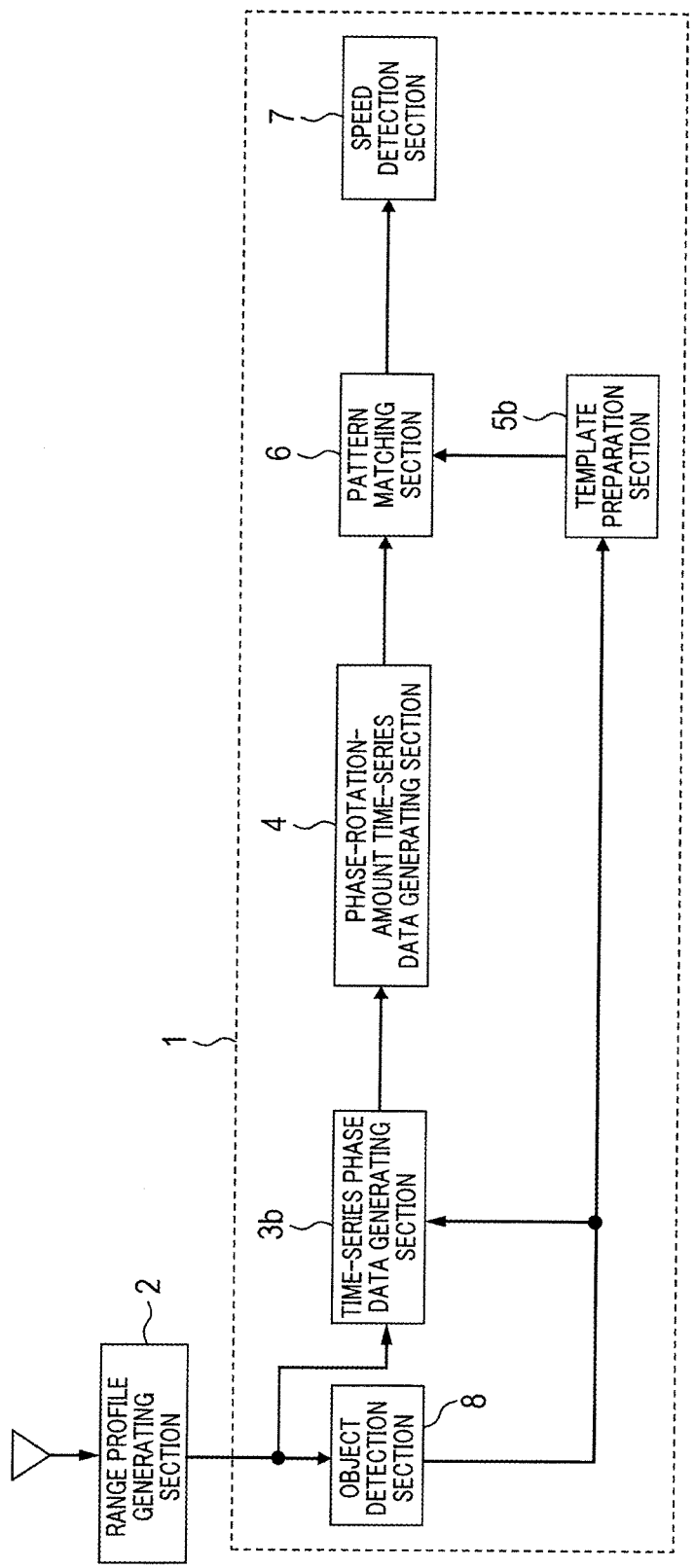
FIG. 12 is a block diagram illustrating a radar signal processing apparatus and associated components according to Embodiment 2 of the present invention.
Figure 13:
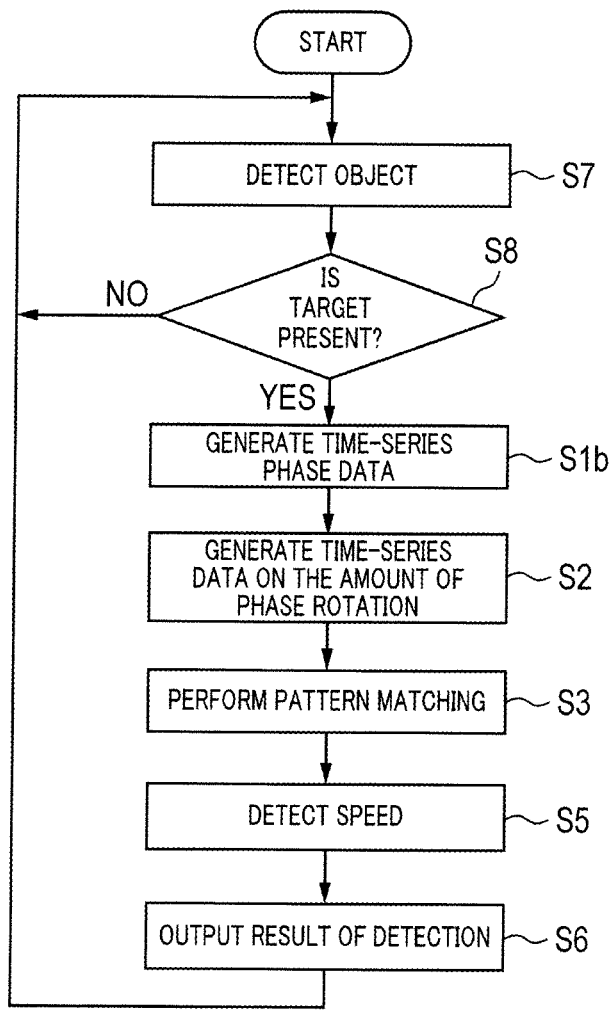
FIG. 13 is a flowchart illustrating the operation of the radar signal processing apparatus in Embodiment 2.

FIG. 12 is a block diagram showing radar signal processing apparatus 1 and peripheral components in Embodiment 2 of the present invention. FIG. 13 is a flowchart illustrating the operation of radar signal processing apparatus 1 in Embodiment 2. In FIGS. 12 and 13, the same components and steps as FIGS. 9 and 10 are denoted by the same reference numerals and their descriptions are omitted.

FIG. 12 is different from FIG. 8 in three respects: firstly, object detection section 8 is added; secondly, time-series phase data generating section 3b is provided in place of time-series phase data generating section 3; and thirdly, template preparation section 5b is provided in place of template preparation section 5.

Object detection section 8 conducts an object detection process for detecting the presence of an object in the detection range of the radar. An object as called herein means the target. Object detection section 8 accordingly may also be described as "target detection section." For detecting whether the target is present or not, object detection section 8 predefines a threshold for the power of the reflected wave on a per-range bin basis. The threshold is an electrical power value of a minimum level that should be observed by the radar when the target is present at the distance corresponding to a range bin. That is, if the power of the reflected wave is below the threshold, it means no object is present at the distance indicated by the corresponding range bin. Representing I signal and Q signal for the nth range bin in a range profile as I(n) and Q(n) respectively, the electrical power (n) of the reflected wave from the target positioned at the distance corresponding to the nth range bin is defined by following equation 9:

[9]

$$\text{Power}(n) = I^2(n) + Q^2(n) \qquad \text{(Equation 9)}$$

Object detection section 8 calculates the power of the reflected wave using equation 9 based on a range profile. Object detection section 8 then compares the calculated power of the reflected wave to the predefined threshold. If the comparison shows the power of the reflected wave is above the threshold, object detection section 8 decides that the target is present in the detection range of the radar. Object detection section 8 identifies the range bin in which the target is present and outputs data indicative of the range bin to time-series phase data generating section 3b and template preparation section 5b. If none of the power of the reflected waves is above the threshold in the range bins in the comparison, object detection section 8 decides that the target was not present in the detection range of the radar, and then proceeds to perform the object detection process for the next range profile.

Time-series phase data generating section 3 in Embodiment 1 generates time-series phase data for all range bins; whereas time-series phase data generating section 3b according to Embodiment 2 generates time-series phase data only for a range bin identified by object detection section 8.

Template preparation section 5 in Embodiment 1 prepares templates for time-series data on the amount of phase rotation corresponding to distances d represented by all range bins and moving speeds (assumed speeds) V of the target. In contrast, template preparation section 5b in Embodiment 2 prepares only time-series data on the amount of phase rotation template for distance d which corresponds to the range bin identified by object detection section 8 and the moving speed (assumed speed) V of the target.

Next, the operation of radar signal processing apparatus 1 is described with reference to FIG. 13.

At step S7, object detection section 8 performs an object detection process based on the range profile from range profile generating section 2. Specifically, object detection section 8 calculates the power of the reflected wave from the range profile and compares it to the threshold. Object detection section 8 then determines whether the power of the reflected wave is above the threshold or not.

At step S8, object detection section 8 determines whether the target is present or not based on whether the power of the reflected wave is above the threshold or not.

If it is determined at step S8 that the power of the reflected wave is above the threshold, object detection section 8 decides that the target is present in the detection range of the radar (S8: YES). Object detection section 8 then identifies the range bin in which the target is present, and outputs data indicative of the range bin to time-series phase data generating section 3*b* and template preparation section 5*b*. The flow then proceeds to step S1*b*.

If it is determined at step S8 that the power of the reflected wave is not above the threshold for any of range bins, object detection section 8 decides that the target is not present in the detection range of the radar (S8: NO). The flow then returns to S7, where object detection section 8 performs an object detection process according to the next range profile.

At step S1*b*, time-series phase data generating section 3*b* generates time-series phase data at the range bin identified by object detection section 8.

At step S2, phase-rotation-amount time-series data generating section 4 generates time-series data on the amount of phase rotation at the identified range bin based on the time-series phase data generated by time-series phase data generating section 3*b*.

At step S3, pattern matching section 6 performs the pattern matching process based on the time-series data on the amount of phase rotation generated by phase-rotation-amount time-series data generating section 4.

The pattern matching process at step S3 is performed as described in the flowchart of FIG. 10. At step S31, however, template preparation section 5*b* prepares time-series data on the amount of phase rotation templates for the distance d corresponding to the range bin identified by object detection section 8 and the moving speed V of the target. Template preparation section 5*b* may generate templates by calculation according to the distance d to the target and the moving speed V of the target or prepare templates beforehand and store them in memory.

In Embodiment 1, the pattern matching process against templates is conducted for all range bins through the loop at step S4 in FIG. 9, whereas in Embodiment 2 only one range bin representing the distance to the target is determined by object detection section 8. The pattern matching process at pattern matching section 6 accordingly has to be done on the only one range bin identified. As a result, Embodiment 2 provides the effect of the amount of computation being significantly reduced as compared to Embodiment 1.

Radar signal processing apparatus 1 in Embodiment 1 cannot determine when the target will pass through the detection range of the radar (antenna) because it does not have object detection section 8. This requires radar signal processing apparatus 1 in Embodiment 1 to perform computation for the pattern matching process at all times. In contrast, as radar signal processing apparatus 1 in Embodiment 2 has object detection section 8, it is not necessary to perform extra computation processing when passing of the target has not been detected. Embodiment 2 therefore also provides the effect of reduced power consumption of radar signal processing apparatus 1.

Embodiments 1 and 2 have been described above with an example in which the present invention is implemented by hardware, but the present invention can be implemented by software in concert with hardware.

A radar signal processing apparatus according to this disclosure includes: a time-series phase data generating section that generates time-series phase data based on a range profile indicating, for each range bin, a phase of a reflected wave of a radio wave transmitted to a target moving on a certain path, the time-series phase data indicating through time a phase of the reflected wave in a particular range bin; a phase-rotation-amount time-series data generating section that divides the time-series phase data into segments of a predetermined time length, calculates an amount of phase rotation that occurs in the segments, and generates time-series data on the amount of phase rotation indicative of the amount of phase rotation; a pattern matching section that performs pattern matching between the time-series data on the amount of phase rotation and a template of time-series data on the amount of phase rotation that is defined by a distance from a radar to the path and by a moving speed of the target; and a speed detection section that detects the moving speed of the target based on a result of the pattern matching.

In the radar signal processing apparatus according to the disclosure, a maximum value of the predetermined time length is a time length of a segment in which a discontinuous phase change occurs due a change in position at which the radio wave is reflected on the target.

In the radar signal processing apparatus according to the disclosure, the pattern matching section uses all templates of the time-series data on the amount of phase rotation to perform the pattern matching on time-series data on the amount of phase rotation generated by the phase-rotation-amount time-series data generating section.

In the radar signal processing apparatus according to the disclosure, generation of the time-series phase data, generation of the time-series data on the amount of phase rotation, and the pattern matching are performed for all range bins.

In the radar signal processing apparatus according to the disclosure, the template of the time-series data on the amount of phase rotation is predefined based on a detection range of the radar.

In the radar signal processing apparatus according to the disclosure, the time-series phase data generating section receives the range profile from the radar that transmits the radio wave in a direction orthogonal to the path.

The radar signal processing apparatus according to the disclosure further includes a target detection section that detects a presence of the target in the detection range of the radar based on the range profile and identifies the range bin in which the target is positioned, in which: the time-series phase data generating section generates time-series phase data in the range bin identified by the target detection section and outputs the time-series phase data to the phase-rotation-amount time-series data generating section; and the pattern matching section performs pattern matching between the time-series data on the amount of phase rotation generated by the phase-rotation-amount time-series data generating section and a prepared template of time-series data on the amount of phase rotation that is defined by a distance corresponding to the range bin identified by the target detection section and the moving speed of the target.

A radar signal processing method according to this disclosure includes: generating time-series phase data based on a range profile indicating, for each range bin, a phase of a reflected wave of a radio wave transmitted to a target moving on a certain path, the time-series phase data indicating through time a phase of the reflected wave in a particular range bin; dividing the time-series phase data into segments of a predetermined time length, calculating an amount of phase rotation that occurs in the segments, and generating time-series data on the amount of phase rotation indicative of the amount of phase rotation; performing pattern matching between the time-series data on the amount of phase rotation and a template of time-series data on the amount of phase rotation that is defined by a distance from a radar to the path and by a moving speed of the target; and detecting the moving speed of the target based on a result of the pattern matching.

A radar signal processing program according to this disclosure is a program for causing a computer to execute processing including: generating time-series phase data based on a range profile indicating, for each range bin, a phase of a reflected wave of a radio wave transmitted to a target moving on a certain path, the time-series phase data indicating through time a phase of the reflected wave in a particular range bin; dividing the time-series phase data into segments of a predetermined time length, calculating an amount of phase rotation that occurs in the segments, and generating time-series data on the amount of phase rotation indicative of the amount of phase rotation; performing pattern matching between the time-series data on the amount of phase rotation and a template of time-series data on the amount of phase rotation that is defined by a distance from a radar to the path and by a moving speed of the target; and detecting the moving speed of the target based on a result of the pattern matching.

The disclosure of the specification, drawings, and abstract included in Japanese Patent Application No. 2012-228868, filed on Oct. 16, 2012, is incorporated herein by reference in its entirety.

INDUSTRIAL APPLICABILITY

The radar signal processing apparatus, radar signal processing method, and radar signal processing program according to the present invention are advantageous as an apparatus, a system, a method, and a program for detecting the moving speed of a moving target by emitting a radio wave to the target and detecting a reflected wave from the target.

REFERENCE SIGNS LIST

1 Radar signal processing apparatus
2 Range profile generating section
3 Time-series phase data generating section
3b Time-series phase data generating section
4 Phase-rotation-amount time-series data generating section
5 Template preparation section
5b Template preparation section
6 Pattern matching section
7 Speed detection section
8 Object detection section
23 Target
24 Direction in which reflected wave from target propagates
31 Radar antenna
32 Path
33 Target
34 Normal drawn from antenna to path
41 Vehicle
42 Emission range of radio waves from radar
43 Reflection point
44 Reflection point
51 Point of change in phase of reflected wave from target
71 Segment containing timing at which change in reflection point occurs
101 Phase-rotation-amount data for when target is positioned outside radar's detection range
102 Amount of phase rotation of reflected wave from target
103 Phase-rotation-amount data for when target is positioned outside radar's detection range

The invention claimed is:

1. A radar signal processing apparatus comprising:
a time-series phase data generating section that generates time-series phase data based on a range profile indicating, for each range bin, a phase of a reflected wave of a radio wave transmitted to a target moving on a certain path, the time-series phase data indicating through time a phase of the reflected wave in a particular range bin;
a phase-rotation-amount time-series data generating section that divides the time-series phase data into segments of a predetermined time length, calculates an amount of phase rotation that occurs in the segments, and generates time-series data on the amount of phase rotation indicative of the amount of phase rotation;
a pattern matching section that performs pattern matching between the time-series data on the amount of phase rotation and a template of time-series data on the amount of phase rotation that is defined by a distance from a radar to the path and by a moving speed of the target; and
a speed detection section that detects the moving speed of the target based on a result of the pattern matching.

2. The radar signal processing apparatus according to claim 1, wherein a maximum value of the predetermined time length is a time length of a segment in which a discontinuous phase change occurs due a change in position at which the radio wave is reflected on the target.

3. The radar signal processing apparatus according to claim 1, wherein the pattern matching section uses a plurality of templates of the time-series data on the amount of phase rotation to perform the pattern matching on time-series data on the amount of phase rotation generated by the phase-rotation-amount time-series data generating section.

4. The radar signal processing apparatus according to claim 1, wherein generation of the time-series phase data, generation of the time-series data on the amount of phase rotation, and the pattern matching are performed for all range bins.

5. The radar signal processing apparatus according to claim 1, wherein the template of the time-series data on the amount of phase rotation is predefined based on a detection range of the radar.

6. The radar signal processing apparatus according to claim 1, wherein the time-series phase data generating section receives the range profile from the radar that transmits the radio wave in a direction orthogonal to the path.

7. The radar signal processing apparatus according to claim 1, further comprising a target detection section that detects a presence of the target in the detection range of the radar based on the range profile and identifies the range bin in which the target is positioned, wherein:

the time-series phase data generating section generates time-series phase data in the range bin identified by the target detection section and outputs the time-series phase data to the phase-rotation-amount time-series data generating section; and the pattern matching section performs pattern matching between the time-series data on the amount of phase rotation generated by the phase-rotation-amount time-series data generating section and a prepared template of time-series data on the amount of phase rotation that is defined by a distance corresponding to the range bin identified by the target detection section and the moving speed of the target.

8. A radar signal processing method comprising:

generating time-series phase data based on a range profile indicating, for each range bin, a phase of a reflected wave of a radio wave transmitted to a target moving on a certain path, the time-series phase data indicating through time a phase of the reflected wave in a particular range bin;

dividing the time-series phase data into segments of a predetermined time length, calculating an amount of phase rotation that occurs in the segments, and generating time-series data on the amount of phase rotation indicative of the amount of phase rotation;

performing pattern matching between the time-series data on the amount of phase rotation and a template of time-series data on the amount of phase rotation that is defined by a distance from a radar to the path and by a moving speed of the target; and detecting the moving speed of the target based on a result of the pattern matching.

9. A non-transitory computer-readable medium having stored thereon a radar signal processing program for causing a computer to execute processing comprising:

generating time-series phase data based on a range profile indicating, for each range bin, a phase of a reflected wave of a radio wave transmitted to a target moving on a certain path, the time-series phase data indicating through time a phase of the reflected wave in a particular range bin;

dividing the time-series phase data into segments of a predetermined time length, calculating an amount of phase rotation that occurs in the segments, and generating time-series data on the amount of phase rotation indicative of the amount of phase rotation;

performing pattern matching between the time-series data on the amount of phase rotation and a template of time-series data on the amount of phase rotation that is defined by a distance from a radar to the path and by a moving speed of the target; and detecting the moving speed of the target based on a result of the pattern matching.

* * * * *